United States Patent [19]
Borel

[11] 3,858,300
[45] Jan. 7, 1975

[54] JACKSCREW DEVICE

[76] Inventor: Henry B. Borel, 210 Burr St., Houston, Tex. 77011

[22] Filed: Sept. 29, 1972

[21] Appl. No.: 293,649

[52] U.S. Cl..................................... 29/256, 29/263
[51] Int. Cl............................................. B23p 19/02
[58] Field of Search.......... 29/256, 262, 265; 85/36

[56] References Cited
UNITED STATES PATENTS

| | | | |
|---|---|---|---|
| 1,631,889 | 6/1927 | Rappley............................... | 29/256 |
| 2,160,395 | 5/1939 | Wettlaufer........................... | 29/256 |
| 2,339,897 | 1/1944 | Wetzler................................ | 85/36 |

*Primary Examiner*—Al Lawrence Smith
*Assistant Examiner*—Harold P. Smith, Jr.

[57] ABSTRACT

A device for assembling and disassembling a shaft and a member tightly mounted on the shaft, as by a key, press fit, etc. The device of the invention has been called a "jackscrew" because it may be used to apply a force to one object to separate it from a second object, e.g., a fan rotor from a shaft. Another suitable name would be press-and-pusher, or press-pusher, as the same device may be used to effect a press fit of a rotor on a shaft, and later to push the rotor from the shaft.

It consists essentially of an elongated nut having interior threads and receiving a bolt or screw having complementary exterior threads. The threaded length of the nut is preferably somewhat greater than the body or threaded portion of the screw, to insure that the nut engages the end of the rotor while the screw engages the shaft. Each of the screw and nut has flats on its exterior surface for engagement by a wrench, and the head of the screw includes means to engage a shaft received in a central longitudinal opening extending through both screw and nut, to releasably lock the screw to the shaft for common movement therewith. The shaft-engaging means may be jaws having teeth which are brought into engagement with the shaft, the jaws being mounted on pins extending transverely through the screw head. When the two members are threaded together and are slid down the shaft until the nut member butts against the mounted member or rotor to be loosened, the jaws are manipulated so that their teeth engage the shaft, after which the device is operated by the use of wrenches to disengage the screw from the nut. Since the shaft will usually be secured against sliding out of its bearings, the result is a force exerted through the nut on the rotor, pushing it away from the screw of the device. This may cause either an assembly or disassembly of rotor and shaft, depending on the structure used in mounting the rotor. Usually a rotor pressed on from one direction may be pushed loose from the other direction by switching the device of the invention from one end of the rotor to the other.

A refinement provides means for utilizing the device when the member to be loosened is mounted on a shaft having the appropriate end unavailable, e.g., when a spider mounted on a shaft is to be loosened without removing the shaft from its end bearings. This refinement is a matter of providing openings in both screw and nut extending radially from the central opening therethrough and for the full length of each member. The width of the slot is made at least equal to the diameter of the central opening, so that the pair of members or jackscrew device may be mounted on the shaft by a transverse movement through said slots.

2 Claims, 6 Drawing Figures

Patented Jan. 7, 1975

3,858,300

JACKSCREW DEVICE

FIELD OF INVENTION

The present invention may be functionally classified with devices to forcibly separate two members and translate one with respect to the other. In another sense, the present invention may be classified as a mechanical transducer, one in which rotary motion applied to the invention device appears as a linear force output applied to two members to separate one from the other. Again referring to the objects to which the invention device is applied, the invention may be classified with presses and such devices as wheel pullers, i.e., the invention device may be used to forcibly assemble two things together, or may be used with the force supplied in the opposite direction to separate them. It frequently happens that a member mounted on a shaft, usually a round shaft but sometimes of polygonal shape, must be assembled to the shaft or removed therefrom with the aid of external forces applied to produce relative motion between the shaft and other member applied parallel to the longitudinal axis of the shaft. The principal object of the present invention is to provide such a device.

The object of the invention may also be stated as one of supplying a simple device to be mounted on a shaft and brought to bear against a member mounted or to be mounted on said shaft, to apply the necessary force for accomplishing an assembly or disassembly of said member and shaft.

It is also an object of the invention to provide a jackscrew type device for assembling or disassembling a shaft and a member to be tightly mounted on said shaft. Stated somewhat differently, the jackscrew type device to be provided is one in which the invention includes a pair of members to be threadedly engaged with one another and to engage the shaft and member to be mounted (or dismounted) therefrom, one of said rotary members of the invention being fixed to the shaft while the other one is brought to bear against the member to be mounted.

A further object of the invention is to provide a device of a type described which may be used in confined spaces where the room available is not sufficient for more conventional apparatus used to accomplish a disassembly or an assembly operation.

A further object is to provide a jackscrew device of the type alluded to which may be mounted on a shaft by a transverse movement of the invention device relative to said shaft, in particular when the end of the shaft is not available for a mounting operation.

BRIEF DESCRIPTION OF THE INVENTION

The present invention may be thought of as a specialized nut and bolt, there being a longitudinal center opening extending through the members when threaded or partially threaded together to receive a shaft. The nut is elongated so that one end of it will be brought to bear against the rotor or other fixture to be mounted on or dismounted from the shaft when bolt and nut are partially or completely threaded together. The head of the bolt is also elongated so that means may be mounted in it for releasably locking the bolt to the shaft for common movement therewith. When the operation to be performed is an assembly, the bolt is locked to the shaft, and is then screwed out of the nut to forcibly push the rotor onto that portion of the shaft with which it is to form a tight or keyed fit.

When a disassembly operation is in order, the bolt and nut members are pre-connected to one another just as in an assembly operation, but are mounted on that part of the shaft extending from the opposite end of the rotor. The bolt and nut are then rotated relative to each other just as before, i.e., to separate or unscrew the connection, to push the rotor away from the part of the shaft on which it was secured by a key or press fit.

While other means may be used to secure the bolt to the shaft, the preferred mechanism illustrated is a pair of jaws disposed in longitudinal slots diametrically opposed to each other and extending radially outwardly from the center opening through the bolt. Such jaws have teeth formed on one portion and are pivotally mounted on pins extending into the head of the bolt on either side of each slot. When it is desired to disengage the bolt from the shaft, such jaw is rotated to a second position, one in which no part of the jaw engages such shaft, and the bolt may then be slid along the shaft without any action therewith.

To make the device of the invention usable in a situation where the end of the shaft adjacent the rotor mounted or to be mounted on it is not available, i.e., when the shaft is not to be removed from its bearing, the mounting of the device on the shaft may be accomplished by a transverse movement, rather than a longitudinal movement. This is made possible by providing a radially extending slot joining the center opening with the exterior of both nut and bolt, such slots extending longitudinally the full length of both members. The bolt may be partially threaded into the nut, as a preliminary step, until the longitudinal transverse slots are aligned, the partially assembled device may then be slid onto the shaft, and the nut may then be further rotated, as desired, preferably stopping in a position such that the transverse slots are not aligned with each other to prevent the accidental separation of the device from the shaft. Thereafter the use of the device is the same as though it were mounted from the end of the shaft. Further refinements include a wear plate which may be disposed between the end of the fixture mounted on the shaft and the end of the nut of the device, and a semi-cylindrical shell used as a thin extension of the main nut when obstructions are present in the shaft and fixture assembly which require the use of a very small member contacting the fixture.

BRIEF DESCRIPTION OF THE DRAWING FIGURES

In the drawing accompanying the present application, illustrating a preferred embodiment thereof, FIG. 1 is a side elevation of the device of the invention assembled on a shaft and butted up against a fixture mounted on such shaft.

Figure 6:
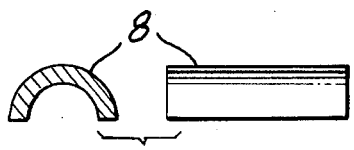

FIG. 6 presents a side elevation and cross section of the other optional feature referred to above, the semi-cylindrical shell which may serve as an extension of the device.

DETAILED DESCRIPTION OF THE INVENTION

The member labeled 1 in the drawing figures may be called a hollow bolt or machine screw, this member having a longitudinal axis with a through opening formed centrally about such longitudinal axis and with a diameter appropriate for receiving a shaft 5 which extends through the fixture 6 mounted or to be mounted on such shaft. While screw 1 is shown as having a larger diameter head than its threaded body 1a, this feature is not essential; indeed, it is not essential that the head ever come into contact with the left hand end of the nut 2, as illustrated, although this does make the assembly more convenient to use. The assembly illustrated was made for use on a one-fourth inch shaft and for such size it became necessary to have an enlarged head; when made for a much larger shaft all that need be available is space to mount and operate the jaws 3.

The nut member 2 has a blind opening 2A formed therein from the left hand end, this being the end to be spaced away from the fixture 6 mounted on the shaft. Such opening 2A is tapped to form threads complementing those on both body 1A, and the two members are readily screwed together or unscrewed to separate one from the other. It is not essential that the longitudinal opening 2A in the nut, which is also concentric with the axis of shaft 5, be a blind opening; it may be a through opening, so long as the threaded and engaged length of the nut is greater than that of the body portion of bolt 1, for in operation the right hand end of the nut must be brought to bear against the fixture mounted (or to be mounted) on the shaft, while the shaft is engaged by the bolt 1, by means of its jaws 3.

Figure 1:
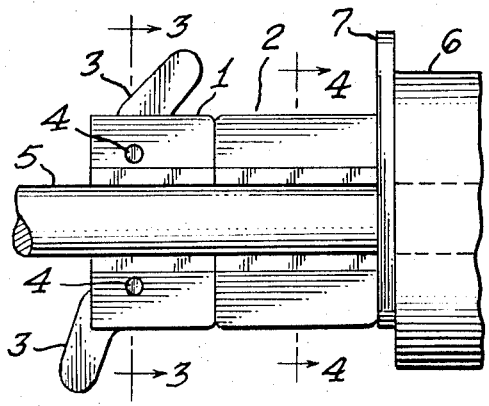
Figure 2:
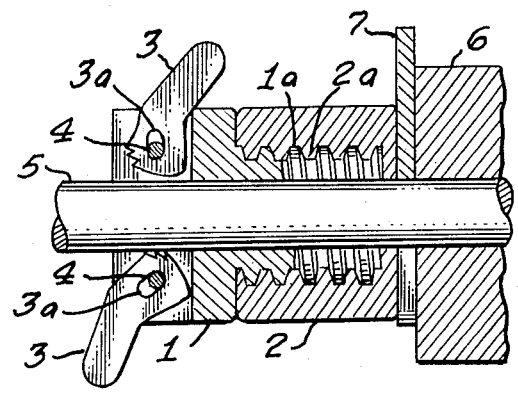
FIG. 2 is a longitudinal section of the assembly of FIG. 1.

In the drawing figures, the lower jaw 3 is shown with its teeth or serrations engaging shaft 5, while the upper jaw 3 has been rotated so that such teeth or serrations face away from the shaft. In this latter position, it will be observed that no part of the jaw engages shaft 5, and when both jaws are in this position bolt 1 may be separated from the assembly simply by rotating it to unscrew it from nut 2. On the other hand, when one or both of the jaws 3 are in the position indicated in FIG. 2 for the lower jaw 3, wrenches may be applied to the nut and bolt to unscrew the one from the other to pull shaft 5 forcibly from fixture 6. In most cases, the actual movement is one of fixture 6 to the right in FIGS. 1 and 2, as the shaft is usually secured to other members which prevent it from moving along its own axis. Each jaw 3 is disposed in a longitudinal slot formed in the head of bolt 1 and pivots about a pin 4 secured in the indicated transverse and aligned slots in the head of bolt 1, as illustrated.

Figure 3:
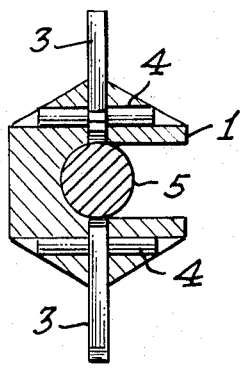
FIG. 3 is a cross section of the same assembly taken through the screw or bolt, as indicated by the lines and arrows labeled 3—3 in FIG. 1, showing the shaft-gripping jaws mounted in the head of the bolt.
Figure 4:
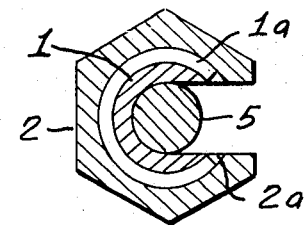
FIG. 4 is a cross section taken through the nut and bolt of the same assembly, as indicated by the lines and arrows labeled 4—4 in FIG. 1.

As indicated in FIGS. 3 and 4, the aligned central openings through bolt 1 and nut 2 may be joined to a radially extending slot running the full length of each member and having a width equal to that of the central opening, so that both members may be mounted by a transverse movement onto shaft 5.

Figure 5:
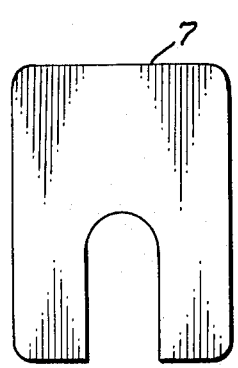
FIG. 5 is a detail showing one of the optional members referred to above, the pressure distributing or wear plate disposed between the fixture mounted on the shaft and the nut portion of the invention.

FIG. 5 illustrates the thrust washer 7, which is not an essential item, but may be disposed between nut 2 and the fixture 6 fastened to shaft 5, to absorb wear and equalize the force transmitted between nut 2 and fixture 6. The indicated slot in thrust washer 7 is, of course, of a width to readily permit it to be slid over the shaft 5.

The semi-cylindrical shell member 8 shown in FIG. 6 may be used as an extension of nut 2 projecting into an assembly including a fixture like item 6 when working in confining circumstances, e.g., when there are other parts of assemblys present which prevent nut 2 from bearing directly against fixture 6, whether with or without a thrust washer 7. In such applications, the shell 8 would be placed on shaft 5 to butt against nut 2 and would project to the right in FIG. 2, permitting nut 2 and bolt 1 to be spaced to the left. If thrust washer 7 were not employed, there would then simply be a gap between the right hand end of nut 2 and the left hand face of fixture 6. It is in this empty space that there may be other items of an overall assembly of which the shaft 5 and fixture 6 form a part, e.g., a housing wall, and it is to avoid such obstacles that the shell 8 would be employed.

It will be appreciated that various other details of the structure illustrated are not essential, even though preferred. The fact that opening 2A in nut 2 may be a through opening has already been mentioned. Another feature that may be varied is the means for rotating nut 2 relative to bolt or screw 1, as the only essential is means formed on the nut to receive some rotary tool, which may be a spanner as well as a wrench. The jaws 3, or one of them used alone, may be relied on to hold bolt 1 against rotation when nut 2 is turned, use of a wrench or similar tool on the bolt being necessary only to prevent both bolt and shaft from rotating with the nut. Other and similar variations will readily occur to those skilled in the art.

What is claimed is:

1. A jackscrew device for assembling or disassembling a shaft and a member tightly mounted on said shaft, said jackscrew device comprising a screw and nut threadedly engaging one another and having a common longitudinal axis and aligned longitudinal openings through both screw and nut concentric about said axis to receive a shaft, the threads in the nut being formed in a longitudinal opening extending from the end of the nut to be spaced away from the member mounted on the shaft, said screw having a head of larger diameter than the portion thereof screwed into said nut and releasable means on said head to secure it tightly to said shaft for common movement therewith, both said nut and said screw having hexagonal exterior surfaces engageable by crescent wrenches to tighten or loosen the threaded engagement therebetween, said releasable means on the head being clear of the wrench-engaging surfaces of the screw head in operative position.

2. A jackscrew device for applying linear force to a rotor mounted on a shaft, said device comprising a hollow bolt having an exteriorly threaded portion formed from one end and a shaft-receiving opening extending from one end to the other, said bolt also having one or more pivotally mounted jaws secured in its unthreaded portion, said jaws having a shaft-engaging or locking position and a disengaged or free position, and further comprising a nut having interior threads complementing those on the hollow bolt, said nut and bolt having a fully screwed-together position such that the nut engages the unthreaded portion of the bolt and no portion of the bolt extends completely through and out of said nut, said nut and bolt both having hexagonal wrench engaging means formed on their outer surfaces engageable by crescent wrenches.

* * * * *